US012791489B2

(12) United States Patent
Jiang et al.

(10) Patent No.: US 12,791,489 B2
(45) **Date of Patent: *Nov. 10, 2026**

(54) METHODS AND SENSORS FOR DETECTION

(71) Applicant: University of Florida Research Foundation, Inc., Gainesville, FL (US)

(72) Inventors: Peng Jiang, Gainesville, FL (US); Zhuxiao Gu, Gainesville, FL (US); Sin-Yen Leo, Gainesville, FL (US)

(73) Assignee: University of Florida Research Foundation, INC., Gainesville, FL (US)

(*) Notice: Subject to any disclaimer, the term of this patent is extended or adjusted under 35 U.S.C. 154(b) by 316 days.

This patent is subject to a terminal disclaimer.

(21) Appl. No.: 18/735,360

(22) Filed: Jun. 6, 2024

(65) Prior Publication Data

US 2026/0043746 A1 Feb. 12, 2026

Related U.S. Application Data

(63) Continuation of application No. 17/901,286, filed on Sep. 1, 2022, now Pat. No. 12,031,919, which is a continuation of application No. 16/765,132, filed as application No. PCT/US2018/066353 on Dec. 19, 2018, now Pat. No. 11,480,527.

(60) Provisional application No. 62/607,975, filed on Dec. 20, 2017.

(51) Int. Cl.
*G01N 21/78* (2006.01)

(52) U.S. Cl.
CPC .................................. *G01N 21/78* (2013.01)

(58) Field of Classification Search
CPC ...................................................... G01N 21/78
See application file for complete search history.

(56) References Cited

U.S. PATENT DOCUMENTS

| | | | |
|---|---|---|---|
| 3,422,535 | A | 1/1969 | Johnson |
| 3,671,105 | A | 6/1972 | Williams et al. |
| 4,125,319 | A | 11/1978 | Frank et al. |
| 4,340,479 | A | 7/1982 | Pall |
| 4,664,748 | A | 5/1987 | Ueno et al. |
| 4,781,441 | A | 11/1988 | Kanbe et al. |
| 4,810,633 | A | 3/1989 | Bauer et al. |
| 5,147,716 | A | 9/1992 | Bellus |
| 5,337,018 | A | 8/1994 | Yamagishi |
| 5,429,743 | A | 7/1995 | Geus et al. |
| 5,529,524 | A | 6/1996 | Jones |

(Continued)

FOREIGN PATENT DOCUMENTS

| | | | |
|---|---|---|---|
| CN | 103935057 | A | 7/2014 |
| CN | 105036068 | A | 11/2015 |

(Continued)

*Primary Examiner* — Lyle Alexander
*Assistant Examiner* — Dwan A Gerido
(74) *Attorney, Agent, or Firm* — Thomas Horstemeyer LLP.

(57) ABSTRACT

Described are chromogenic sensors, methods of use, and kits including sensors. The sensors can have a polymer structure with a waveform cross-section in a programmed state. Upon exposure to a first liquid, the polymer structure in the programmed state changes to polymer structure in an activated state. Methods for measuring the presence of a liquid using the sensor are described, as are kits including the sensors.

16 Claims, 8 Drawing Sheets

(56) References Cited

U.S. PATENT DOCUMENTS

| | | | |
|---|---|---|---|
| 5,641,332 A | 6/1997 | Faber et al. | |
| 5,753,014 A | 5/1998 | Van Rijn | |
| 5,939,189 A | 8/1999 | Phillips et al. | |
| 5,948,470 A | 9/1999 | Harrison et al. | |
| 5,993,661 A | 11/1999 | Ruckenstein et al. | |
| 6,044,981 A | 4/2000 | Chu et al. | |
| 6,531,304 B1 | 3/2003 | Boennemann et al. | |
| 6,565,763 B1 | 5/2003 | Asakawa et al. | |
| 6,649,255 B1 | 11/2003 | Fain et al. | |
| 6,881,582 B2 | 4/2005 | Ratogi et al. | |
| 6,929,764 B2 | 8/2005 | Jiang et al. | |
| 6,958,137 B2 | 10/2005 | Lee et al. | |
| 7,351,470 B2 | 4/2008 | Draheim et al. | |
| 7,630,589 B2 | 12/2009 | Kilic et al. | |
| 7,691,325 B2 | 4/2010 | Chopra et al. | |
| 7,889,954 B2 | 2/2011 | Sailor et al. | |
| 9,233,883 B1 | 1/2016 | Rauscher et al. | |
| 9,272,947 B2 | 3/2016 | Baca et al. | |
| 10,189,967 B2 | 1/2019 | Jiang et al. | |
| 10,700,225 B2 | 6/2020 | Wang et al. | |
| 12,031,919 B2 * | 7/2024 | Jiang | G01N 21/78 |
| 2003/0031438 A1 | 2/2003 | Kambe et al. | |
| 2004/0131779 A1 | 7/2004 | Haubrich et al. | |
| 2004/0131799 A1 | 7/2004 | Arsenault et al. | |
| 2004/0184948 A1 | 9/2004 | Rakow et al. | |
| 2005/0147807 A1 | 7/2005 | Haas et al. | |
| 2006/0137462 A1 | 6/2006 | Divigalpitiya et al. | |
| 2007/0036653 A1 | 2/2007 | Bak et al. | |
| 2007/0156079 A1 | 7/2007 | Brown | |
| 2007/0206270 A1 | 9/2007 | Iwamatsu et al. | |
| 2008/0006574 A1 | 1/2008 | Ramaswamy et al. | |
| 2008/0027199 A1 | 1/2008 | Mazurek et al. | |
| 2008/0108142 A1 | 5/2008 | Hall et al. | |
| 2008/0185498 A1 | 8/2008 | Purdy et al. | |
| 2008/0233418 A1 | 9/2008 | Krueger | |
| 2008/0309923 A1 | 12/2008 | Falk | |
| 2009/0034051 A1 | 2/2009 | Arsenault et al. | |
| 2009/0274873 A1 | 11/2009 | Shinotsuka | |
| 2010/0051561 A1 | 3/2010 | Lee | |
| 2010/0058844 A1 | 3/2010 | Lin et al. | |
| 2010/0068168 A1 | 3/2010 | Song et al. | |
| 2010/0069726 A1 | 3/2010 | Levinson | |
| 2010/0125113 A1 | 5/2010 | Xiao et al. | |
| 2010/0136648 A1 * | 6/2010 | Montes De Oca Balderas | B29C 61/006 425/149 |
| 2010/0150511 A1 | 6/2010 | Arsenault et al. | |
| 2010/0155325 A1 | 6/2010 | Zhang et al. | |
| 2010/0188732 A1 | 7/2010 | Akashi et al. | |
| 2010/0216310 A1 | 8/2010 | Metz et al. | |
| 2010/0218716 A1 | 9/2010 | Havens et al. | |
| 2010/0235107 A1 | 9/2010 | Fukumura et al. | |
| 2010/0244169 A1 | 9/2010 | Maeda et al. | |
| 2010/0315703 A1 | 12/2010 | Purdy et al. | |
| 2011/0019277 A1 | 1/2011 | Sager et al. | |
| 2011/0097814 A1 | 4/2011 | Bommarito et al. | |
| 2011/0111173 A1 | 5/2011 | Ogawa et al. | |
| 2011/0140106 A1 | 6/2011 | Forbes | |
| 2011/0194261 A1 | 8/2011 | Tanaka et al. | |
| 2011/0233476 A1 | 9/2011 | Arsenault | |
| 2011/0255035 A1 | 10/2011 | Wu | |
| 2012/0051489 A1 | 3/2012 | Varanasi et al. | |
| 2012/0073388 A1 | 3/2012 | Chibante | |
| 2012/0074612 A1 | 3/2012 | Scrivens et al. | |
| 2012/0152338 A1 | 6/2012 | Ha et al. | |
| 2012/0225517 A1 | 9/2012 | Zhang et al. | |
| 2012/0262789 A1 | 10/2012 | Xie et al. | |
| 2012/0281292 A1 | 11/2012 | Baca et al. | |
| 2012/0293802 A1 | 11/2012 | Ozin et al. | |
| 2012/0313205 A1 | 12/2012 | Haddad et al. | |
| 2012/0321810 A1 | 12/2012 | Tebby et al. | |
| 2013/0078750 A1 | 3/2013 | Yeo et al. | |
| 2013/0199995 A1 | 8/2013 | Jiang et al. | |
| 2013/0215513 A1 | 8/2013 | Liang et al. | |
| 2013/0222881 A1 | 8/2013 | Aizenberg et al. | |
| 2013/0258483 A1 | 10/2013 | Pett et al. | |
| 2013/0320467 A1 | 12/2013 | Buchanan et al. | |
| 2013/0340824 A1 | 12/2013 | Oh et al. | |
| 2014/0017145 A1 | 1/2014 | Aizenberg et al. | |
| 2014/0106468 A1 | 4/2014 | Boersma | |
| 2014/0166100 A1 | 6/2014 | Watanabe et al. | |
| 2014/0319524 A1 | 10/2014 | Phillips et al. | |
| 2015/0035269 A1 | 2/2015 | Hooper et al. | |
| 2015/0157453 A1 | 6/2015 | Nazirizadeh et al. | |
| 2015/0276989 A1 | 10/2015 | Han et al. | |
| 2016/0032141 A1 | 2/2016 | Maghsoodi et al. | |
| 2016/0254395 A1 | 9/2016 | Jiang et al. | |
| 2016/0326334 A1 * | 11/2016 | Jiang | G02B 1/005 |
| 2017/0209045 A1 | 7/2017 | Choo et al. | |
| 2017/0215790 A1 | 8/2017 | Levinson et al. | |
| 2017/0225395 A1 | 8/2017 | Boydston et al. | |
| 2017/0271259 A1 | 9/2017 | Hotta et al. | |

FOREIGN PATENT DOCUMENTS

| | | | |
|---|---|---|---|
| EP | 0341675 | A2 | 11/1989 |
| EP | 2220520 | A2 | 8/2010 |
| WO | 9820388 | A1 | 5/1998 |
| WO | 1998020388 | A1 | 5/1998 |
| WO | 2000010934 | A1 | 3/2000 |
| WO | 02073699 | A3 | 11/2002 |
| WO | 2007070486 | A2 | 6/2007 |
| WO | 2008060322 | A2 | 5/2008 |
| WO | 2010007853 | A1 | 1/2010 |
| WO | 2015066337 | A1 | 5/2015 |
| WO | 2018213570 | A2 | 11/2018 |

* cited by examiner

METHODS AND SENSORS FOR DETECTION

CROSS-REFERENCE TO RELATED APPLICATIONS

This application is a continuation of U.S. patent application Ser. No. 17/901,286, having the title "METHODS AND SENSORS FOR DETECTION", filed on Sep. 1, 2022, which is the continuation of U.S. patent application Ser. No. 16/765,132 filed May 18, 2020, which application is the 35 U.S. C. § 371 national stage application of PCT Application No. PCT/US2018/066353, filed Dec. 19, 2018, where the PCT claims priority to, and the benefit of, U.S. provisional application entitled "METHODS AND SENSORS FOR DETECTION" having Ser. No. 62/607,975, filed Dec. 20, 2017, each of which are herein incorporated by reference in their entireties.

STATEMENT REGARDING FEDERALLY SPONSORED RESEARCH OR DEVELOPMENT

This invention was made with government support under HDTRA1-15-1-022 awarded by the Department of Defense/Defense Threat Reduction Agency; and under CMMI1562861 awarded by the National Science Foundation. The government has certain rights in the invention.

BACKGROUND

Chromogenic sensors can be used for sensitive and specific detection of a large variety of compounds. However, inexpensive and reliable sensors are not readily available that can be easily quantified. Thus there is a need to overcome these deficiencies.

SUMMARY

Embodiments of the present disclosure provide sensors, methods of use, kits including sensors, and the like.

An embodiment of the present disclosure includes methods of measuring the presence of a first liquid in a liquid mixture. The method includes providing a shape memory polymer substrate having a polymer structure in a programmed state. The polymer structure has a waveform cross-section. The wave can be a square waveform cross-section, a rectangle waveform cross-section, a sine wave waveform cross-section, a triangular waveform cross-section, a sawtooth waveform cross-section, a pyramidal waveform cross-section, or a combination thereof. The method also includes exposing an area of the polymer structure in a programmed state to a liquid mixture. The area of the polymer structure in the programmed state changes to polymer structure in an activated state when exposed to the liquid mixture including the first liquid.

An embodiment of the present disclosure includes chromogenic sensors. The sensors can include a polymer structure in a programmed state. The polymer structure can have a waveform cross-section such as a square waveform cross-section, a rectangle waveform cross-section, a sine wave waveform cross-section, a triangular waveform cross-section, a sawtooth waveform cross-section, a pyramidal waveform cross-section, or a combination thereof. Upon exposure to a first liquid, the polymer structure in the programmed state changes to polymer structure in an activated state.

An embodiment of the present disclosure includes a kit for testing the presence of a first liquid, comprising using the sensors described above and instructions for use of the chromogenic sensor to test for the presence of the first liquid in a liquid mixture.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

Figures 1A, 1B, 1C:
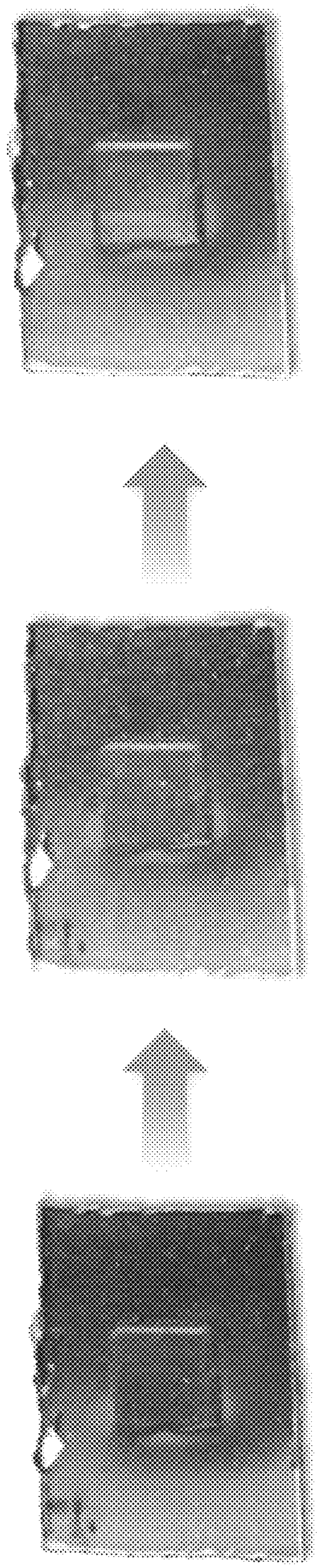
FIGS. 1A-1C are photographs of examples of a shape memory polymer sensor first deformed, then tested on TruFuel®, then Shell RON 93 gasoline.
Figure 1D:
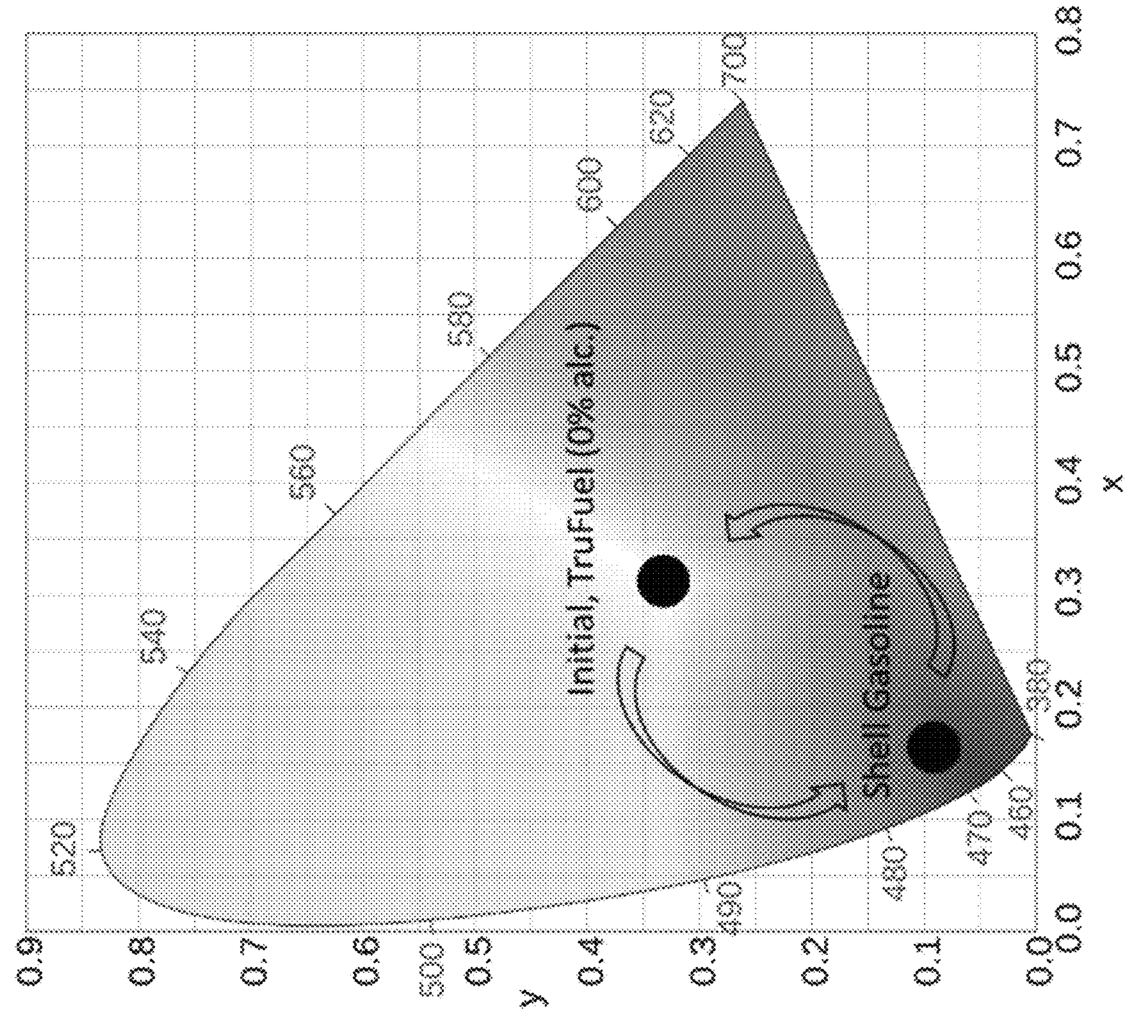
FIG. 1D illustrates the color change of the sensor with CIE 1931 color space (set point 0.33, 0.33 as initial).

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range.

Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for methods of detecting, sensors (e.g., chromogenic sensor), kits, compositions, and the like that related to or use shape memory polymer substrate including a polymer structure. In an aspect, a change of state of the polymer structure as described herein can be used to determine the presence of a certain type(s) of liquid (e.g., ethanol) in a liquid mixture (e.g., gasoline). Embodiments of the present disclosure are scalable in manufacturing, simple to use, provides robust results, and re-useable while also being inexpensive.

In an aspect, the present disclosure includes a method of measuring the presence of a first liquid (or multiple different types of liquids) in a liquid mixture. The liquid mixture (e.g., an aqueous or non-aqueous mixture) can optionally include a first liquid (e.g., an organic solvent such as ethanol). The shape memory polymer substrate (e.g., polymer structure and optionally support structures to hold the polymer structure) can be exposed to the liquid mixture, where the exposure can be direct contact with the liquid mixture or indirectly with the vapor from the liquid mixture. In an aspect, the shape memory polymer substrate or a portion thereof can be dipped into the liquid mixture. In another aspect, an amount (e.g., a drop or larger amount) of the liquid mixture can be disposed onto the surface of the shape memory polymer substrate and contacts the polymer structure. In an aspect, an area of the shape memory polymer substrate can be exposed to the vapor of the liquid mixture and detected indirectly.

It should be noted that in some instances it may be stated that "shape memory polymer substrate is exposed to liquid . . . " or "shape memory polymer substrate state change . . . " or similar statement, but this includes the "polymer structure" since the polymer structure is activated to produce the color change.

Upon exposure of the polymer structure of the shape memory polymer substrate to the liquid mixture, the polymer structure changes state (e.g., from a programmed state to an activated state). The change of state also causes a change in color (e.g., from a first color to a second color), for example from a transparent appearance to an iridescent green or in other instance to blue. The color and color change can be tuned based on the composition of the shape memory polymer substrate and/or the method of making the shape memory polymer substrate. In an aspect, the color change is perceptible by the human eye, while in another aspect the first color and the second color can be evaluated using a device (e.g., image capture device, colorimeter, or the like) to measure the first color and/or the second color. Optionally, the device can correlate the color change or the first color and/or the second color using a known standard to the identity the color (e.g., color change, first color, and/or second color) of the first liquid. In an aspect, the device can include a portable or handheld mobile device such as, e.g., smartphone, digital camera, tablet, laptop, and the like. Images can also be taken on one image capture device and provided to an application on a second device. In an embodiment, the shape memory polymer substrate can be used in a chromogenic sensor and kit to determine the presence of a first fluid in the liquid mixture (e.g., the liquid form, the vapor form, or both). For example, the method, chromogenic sensor, or kit can be useful for detecting the presence or concentration of a component in fuel. In an embodiment, the first liquid can be an organic solvent that can interact with the polymer such as an alcohol (e.g., ethanol) and the liquid mixture can be an aqueous mixture or a non-aqueous mixture such as a hydrocarbon mixture like gasoline. In this regard, the method, chromogenic sensor, or kit of the present disclosure can be used to determine the presence of (e.g., or presence above a certain concentration level) of ethanol in the gasoline, which can be useful in situations that require low or zero ethanol in the gasoline, such as in aircraft fuel.

In regard to the kit, the kit would have instructions and optionally a wipe(s) to clean off the surface of the shape memory polymer substrate, gloves, a device to expose the liquid mixture to the shape memory polymer substrate, and the like. The instructions would, among other things, provide guidance on how to perform the test, evaluate the test (e.g., guide for what the color change means (e.g., presence of a first liquid or the like), clean the shape memory polymer substrate, use the analysis system (e.g., use the mobile device, the webpage to evaluate the results, and the like).

The instructions may include other guidance as well to evaluate the contents of the liquid mixture in question.

In an aspect, the polymer structure of the shape memory polymer substrate (e.g., as included in a chromogenic sensor or similar sensor) is in a programmed state. In an aspect, the shape memory polymer substrate can optionally include one or more substrates to support the polymer structure. In an embodiment, the shape memory polymer substrate can include two substrates (e.g., at one is transparent and can be made of glass, plastic, or the like) on either side of the polymer substrate.

Figure 5:
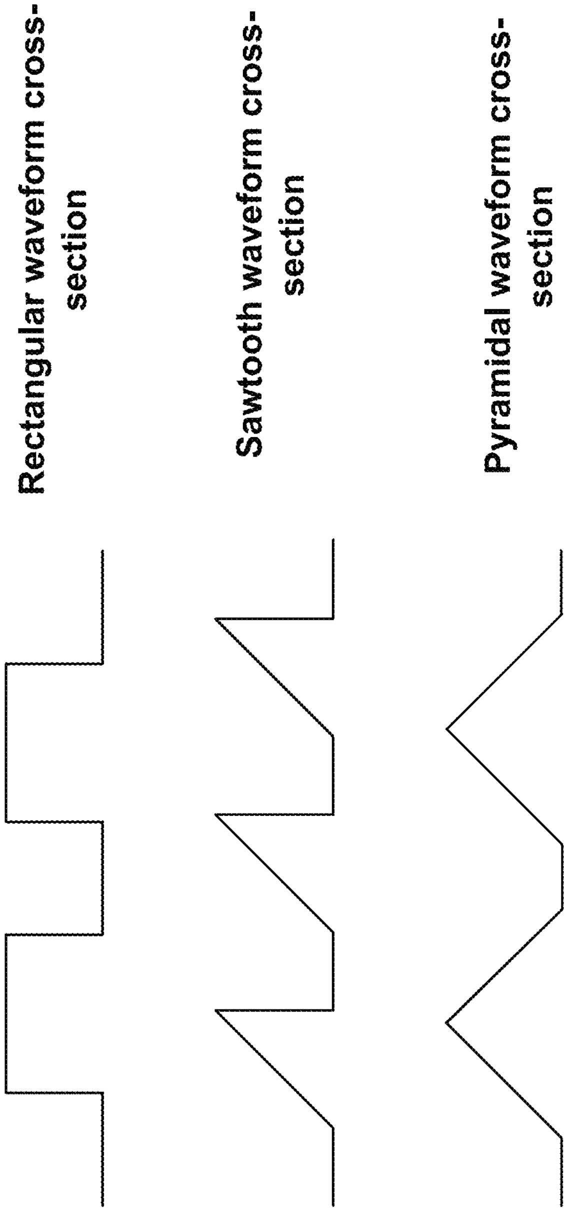
FIG. 5 illustrates various waveform cross-sections.

In an embodiment, the polymer substrate has a waveform cross-section. The waveform cross-section is perpendicular to the plane of the substrate, for example the ridges of a CD or DVD are perpendicular to the plane of the CD or DVD. In an embodiment, the polymer structure can have a ridged structure (e.g., such as a DVD or CD) with peaks and valleys corresponding to the waveform. In an embodiment, the waveform cross-section can be a square (or substantially square) waveform cross-section, a rectangle waveform cross-section, a sine wave waveform cross-section, a triangular waveform cross-section, a sawtooth waveform cross-section, a pyramidal waveform cross-section, and a combination thereof (See FIG. 5). In an aspect, the waveform cross-section is similar to that of a DVD or CD. One or more of the dimensions of the peaks and valleys can be about 10 nm to 10 cm or about 0.1 mm to 1 cm, depending upon the particular application, and in an embodiment are within the standard dimensions of a DVD or CD. In the programmed state, one or more dimensions of the waveform of the polymer structure will be different than one or more dimensions of the waveform of the polymer structure in the activated state. The change in the one or more dimensions results in each state having a first color and second color, respectively the programmed state and the activated state.

As mentioned above, the polymer structure has a starting state, a programmed state, and an activated state. In the starting state, the polymer structure has a starting set of dimensions, while in the programmed state the polymer structure has a program set of dimensions. In the activated state, the polymer structure has an activated set of dimensions. In an embodiment, the starting state has one or more dimensions that is greater than the programmed state, while the programmed state has one or more dimensions that is less than that of the activated state.

In an aspect, the polymer structure in the programmed state will convert to the polymer structure in the activated state when an activation condition is applied to the polymer structure in the programmed state. In an embodiment, the activation condition can be exposure to a first liquid (e.g., an alcohol such as ethanol) in a liquid mixture. The polymer structure in the programmed state can be exposed to the first liquid and transition into the polymer structure in the activated state.

In an embodiment, the polymer structure can be made by heating polymer structure in the starting state to a programming temperature under a first pressure and/or temperature to form the polymer structure in the programmed state. Subsequently, the polymer structure in the programmed state is cooled under the first pressure to a cooling temperature (ambient temperature of about 0 to 40° C.), where the polymer structure remains in the programmed state after cooling. In other words, the programming temperature is greater than the transition temperature of the polymer, and since the molecular chains of the polymer are flexible, the polymer compresses under the first pressure. During the cooling process under the first pressure, the molecular chains of the polymer lock into place, so that when the first pressure is released, the shape memory polymer stays in the programmed state. Exposing the polymer structure in the programmed state to the first liquid allows the locked molecular chains to release and convert to the activated state having one or more greater dimensions than in the programmed state.

In an aspect and as stated briefly above, the polymer structure in the programmed state has a first color and the polymer structure in the activated state has a second color, where the first color and the second color are distinguishable. In an aspect, the first color and the second color are distinguishable using the naked eye for a majority of individuals without color vision deficiencies for the first color and the second color. In an aspect, the first color and/or the second color can be measured colorimetrically with a device such as a smart phone or other device that can capture a picture of the polymer structure or a device that can measure the color such as a colorimeter. In an aspect, the change in color or the difference in the first and the second color can be used to determine the presence of a first liquid in a liquid mixture. For example, the polymer structure in the programmed state can be exposed to the liquid mixture and if present, the polymer structure in the programmed state changes to the polymer structure in the activated state. The second color can be measured, and if present, indicates that the liquid mixture includes the first liquid. Alternatively, the first color can be measured prior to exposure to the liquid mixture and then the color of the polymer structure can be measured after exposure, and if the second color is measured (by comparison with the first color) then the first liquid is present in the liquid mixture. If not change in color is measured, then the first liquid is not present in the liquid mixture.

The methods and compositions described herein can use a large variety of shape memory polymers to form the polymer structure of the shape memory polymer substrate depending on the desired configuration of the tunable polymer membrane. In an embodiment, the polymer structure comprises a polymer such as a thermoplastic shape memory polymer can be a thermoplastic shape memory polymer and/or a thermosetting shape memory polymer. In an embodiment, the polymer structure comprises a polymer such as a thermoplastic shape memory polymer can be a thermoplastic shape memory polymer and/or a thermosetting shape memory polymer. In an embodiment, the thermoplastic shape memory polymer can be selected for instance from organic thermoplastic polymer such as: polyurethane, polyaryletherketone (PAEK), polyether ether ketone (PEEK), polypropylene (PP), polystyrene, polynorbornene, polyester, polyether, polyethylene terephthalate (PET), polyethyleneoxide (PEO), poly(methyl mathacrylate) (PMMA), epoxy, and a combination thereof.

In an aspect, the shape memory polymers of the polymer structure can be described herein can be elastic or glassy. A "glassy" polymer can be a polymer or copolymer with glass transition temperature higher than room temperature. A "glassy" polymer can be optically transparent. A glassy polymer as used herein can have a glass transition state ($T_g$) higher than room temperature. In an embodiment, a glassy polymer has a $T_g$ of about 120° C. In an embodiment, the glassy polymer is poly(urethane) (with a typical $T_g$ of about 90° C.), polyethylene terephthalate (PET) and polyethyleneoxide (PEO), block copolymers containing polystyrene and poly(1,4-butadiene), and poly(2-methyl-2-oxazoline) and polytetrahydrofuran, polynorbornene, epoxy, and other types of shape memory polymers.

As described generally above, aspects of the present disclosure provide for methods of measuring the presence of a first liquid in a liquid mixture. In an aspect, a method can include using a polymer structure in a programmed state, where the polymer structure has a waveform cross-section selected from the group consisting of: a square (or substantially square) waveform cross-section, a rectangle waveform cross-section, a sine wave waveform cross-section, a triangular waveform cross-section, a sawtooth waveform cross-section, a pyramidal waveform cross-section, and a combination thereof. The polymer structure can be exposed to a liquid mixture that may include the first fluid. An area of the polymer structure in the programmed state will change to a polymer structure in an activated state when exposed to the liquid mixture that includes the first liquid or remain unchanged if the first fluid is not present. The polymer structure in the programmed state has a first color and the polymer structure in the activated state has a second color, where the first color and the second color are distinguishable. Thus, when the first liquid is present in the liquid mixture, the polymer structure will be in the activated state and have the second color. The first color and/or second color can be measured using colorimetrically using a device such as a smart phone or colorimeter. In an embodiment where a device capable of obtaining a digital image is used, a digital picture of the shape memory polymer substrate in the activated state (and/or optionally in the programmed state prior to exposure to the liquid mixture) can be examined to determine the RGB values of the polymer structure and if the RGB value is within a pre-determined range and/or distinguishable from the RGB value of the polymer structure in the programmed state, it can be determined that the first liquid is present in the liquid mixture. Although the RGB color index is used in an embodiment, other color indexes (e.g. hex, CYMK, Pantone) can be used to determine if the first color and the second color are distinguishable and/or if the second color is within a value range to confirm the polymer structure is in the activated state.

In an aspect, the polymer structure of the shape memory polymer substrate can be made by disposing precursor materials (e.g., a monomer, a monomer composition, or a polymer) used to form the polymer of the polymer structure in a mold to produce the desired waveform cross-section. After monomers are placed in the space, they can be polymerized by a polymerization method to form the polymer structure. In an aspect, the polymerization method can be photo-polymerization, wherein the monomers are polymerized by the application of light. In an embodiment, the light can be UV light and can be applied for a period of time. One or more other polymerization methods, such as thermal polymerization, can be used and the appropriate components (e.g., initiators and the like) can be included with the precursor materials to cause the polymerization.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Polymer-based chromogenic sensors can be an inexpensive and reliable tool for sensitive and specific detection of a large variety of analytes. However, it is hard to quantify with the naked eye. Smartphones offer a unique resource as an imaging, analysis, storage, and transmission of results. Hence, the present disclosure describes an alternative-inexpensive and reliable chromogenic sensors by integrating new shape memory polymers with periodic grating structures templated from optical discs, such as DVDs. These novel sensors can be easily implemented with mobile smartphone platforms for quantitative analysis.

Figure 4:
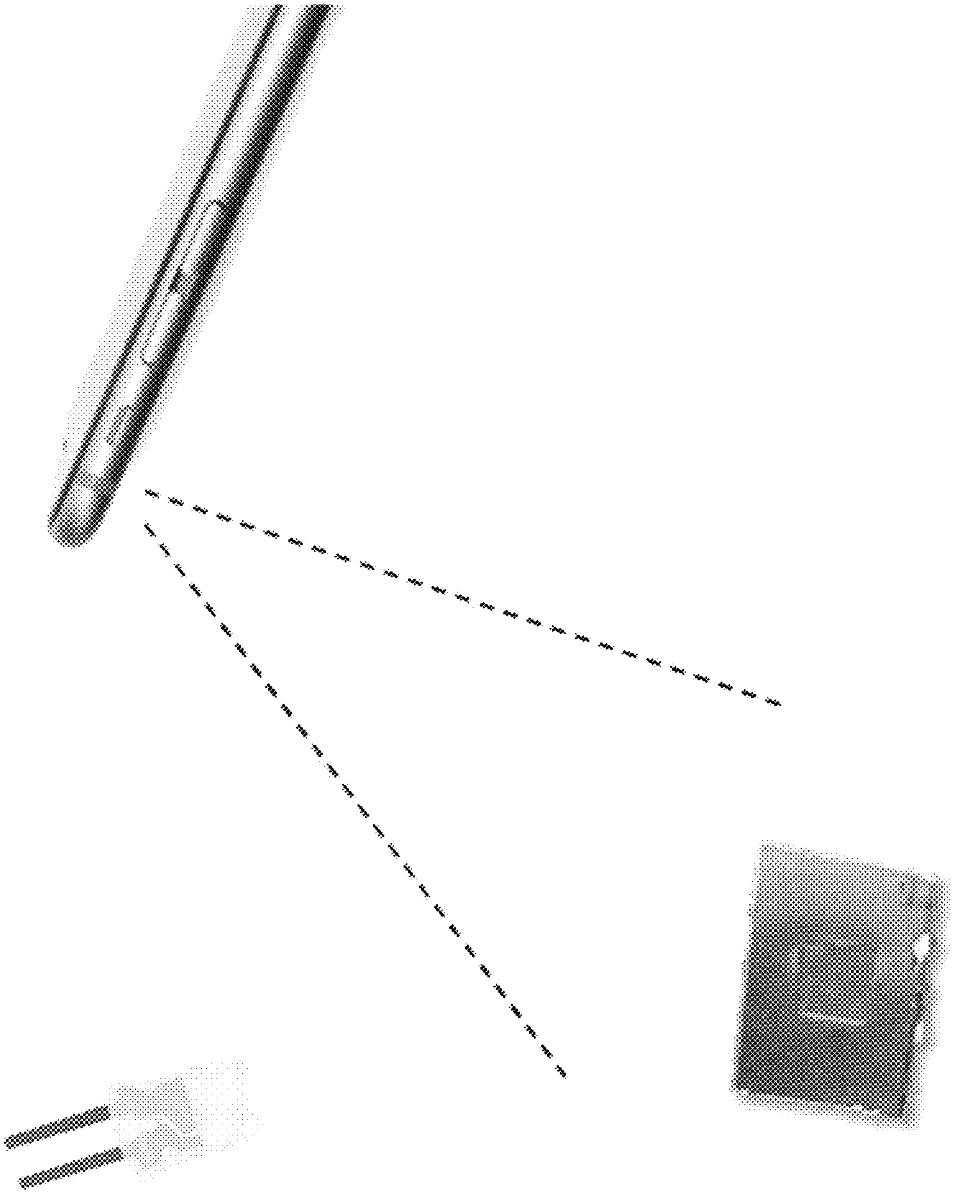
FIG. 4 is a schematic illustration of an embodiment of colorimetric detection with a smartphone.

A templating method for replicating the DVD grating structure with shape memory polymers was employed in fabricating the chromogenic sensors. The polyurethane monomer and photoinitiator mixture was first heated up to 80° C. and then poured onto the DVD grating, which was washed thoroughly with ethanol three times. After that, the mixture was allowed to cool down to room temperature. It was then polymerized with a transilluminator for 90 min. Finally, the polyurethane was removed from the DVD grating. To deform the templated SMP sensor, the sample was placed in between a pre-cleaned glass substrate and a smaller glass piece. The sample was then held by two stainless steel plates, and a clamp force of 120 lb was applied using a manual hydraulic press (Carver Model C). The temperature of the system rapidly was increased from room temperature to ~95° C. and held at this temperature for 5 min. The sample then cooled down to room temperature. After releasing the clamp force, the pressed region became nearly transparent as shown in FIG. 4. During the above heating process, the polymer became soft and flexible. The applied clamp force was sufficient to deform the templated nanostructures into featureless film. During cooling, the polymer underwent a rubbery-to-glassy state transition and the temporary, featureless state was programmed into the polymer.

This simple setup comprises a smartphone as a photodetector, a light source from the phone, and the sensor (FIG. 4). A homemade frame was used to mount the phone to control its relative position to the sensor and the camera's light collection angle (~45° from the normal of the sensor surface). A digital image of the sample was then captured, and the RGB values corresponding to a cropped circular area (radius ~3 mm) were analyzed using the free Color Mate Version 1.2.2 app. In other embodiments, the light source could be separate from the smartphone/photodetector.

The chromogenic sensors were tested using commercial ethanol-free TruFuel and RON (Research Octane Number) 93 gasoline. FIG. 1A shows the initial, as-prepared sample that was first deformed by placing a nearly square-shaped glass piece on the templated polymer sample, which was supported by a glass substrate. A clamp force of 120 lb was then applied on the glass-polymer-glass sandwich structure through the hydraulic press at ~95° C. After 5 min, the sample was cooled to room temperature. The deformed square-shaped area changed from iridescent to transparent. No apparent changes occurred for the programmed samples in TruFuel®, which contains no ethanol at all, for more than 5 minutes (FIG. 1B). The striking color changes of the sensor occurred when dipped into the Shell RON 93 gasoline, (FIG. 1C) shown after 5 seconds. This experiment proves that the sensor described herein could easily distinguish ethanol-free gasoline from regular gasoline-ethanol blends by simply dipping the sensor into the liquid for a short period of time.

Figures 2A, 2B, 2C:
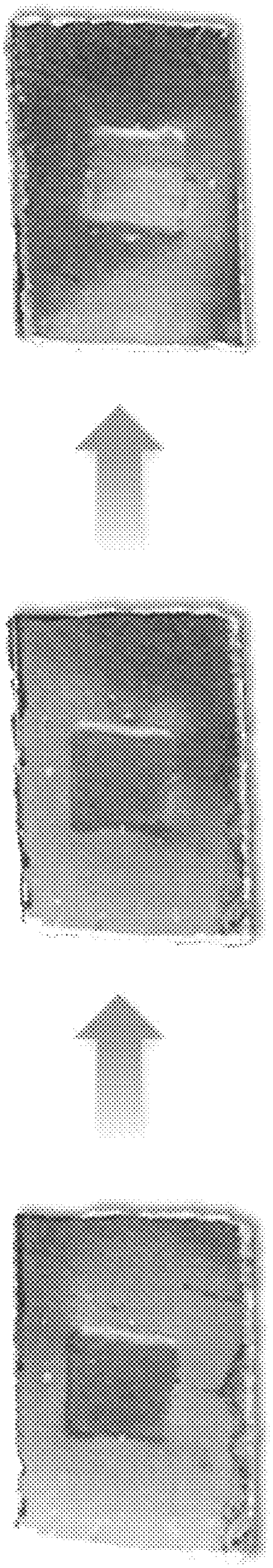
FIGS. 2A-2C are photographs of examples of a shape memory polymer sensor first deformed, then tested on alcohol-free Listerine®, then regular Listerine®.
Figure 2D:
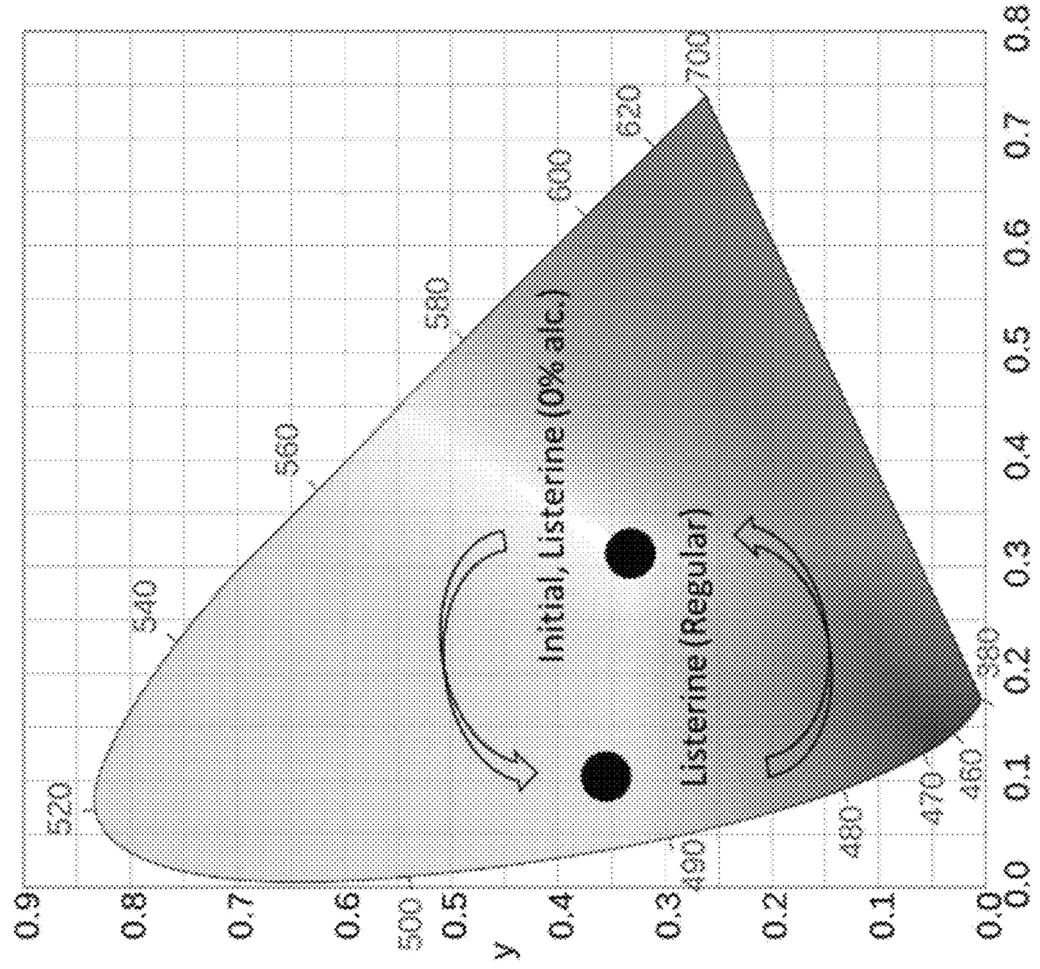
FIG. 2D illustrates the color change of the sensor with CIE 1931 color space (set point 0.33, 0.33 as initial).

Again, while sensing ethanol in gasoline demonstrated the capability of using the smartphone as well as the sensor, a critical challenge was taking the same concept to test for ethanol in other commercial consumer products. FIG. 2A shows the initial, as-prepared sample that was first deformed using the same method as FIG. 1A. There are no apparent changes for the programmed samples immersed in alcohol-free Listerine® antiseptic mouthwash (FIG. 2B). Next, the sample was dipped into regular Listerine® antiseptics for 5 s and it shows apparent chromogenic effects (FIG. 2C). Although, traditional lab-based spectroscopy-based analysis might be more accurate, our low-cost sensor setup offers a convenient and inexpensive solution for a large number of customers to use at home by themselves.

Figure 3A:
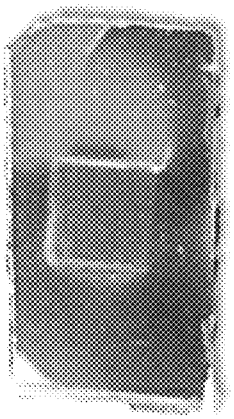
FIGS. 3A-3C are photographs of examples of a shape memory polymer sensor first deformed, then tested on ethanol-free NyQuil™, then regular NyQuil™.
Figure 3B:
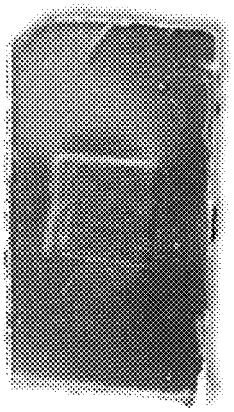
Figure 3C:
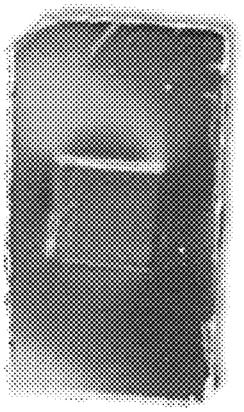
Figure 3D:
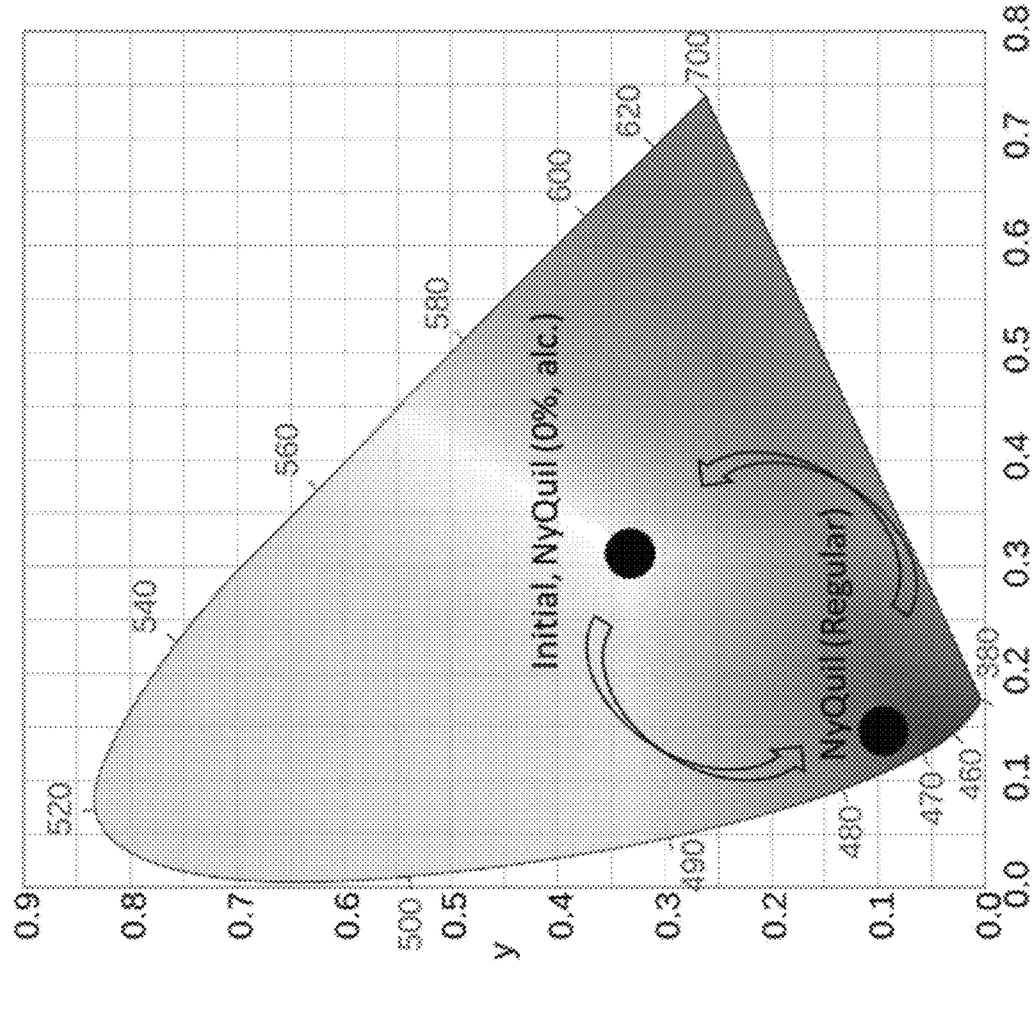
FIG. 3D illustrates color change of the sensor with CIE 1931 color space (set point 0.33, 0.33 as initial).

The sensor was also used to distinguish ethanol-free (FIG. 3B) and regular NyQuil™ Cold & Flu (FIG. 3C) medicine. The results obtained, shown in FIGS. 3A-3D, were similar to those in the fuel and mouthwash experiments, indicating that the sensor can detect ethanol in multiple types of consumer products.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A chromogenic sensor, comprising:

a shape memory polymer structure in a programmed state, wherein the shape memory polymer structure has a waveform cross-section selected from the group consisting of: a rectangle waveform cross-section, a sawtooth waveform cross-section, and a pyramidal waveform cross-section;

and wherein the chromogenic sensor has a characteristic that the shape memory polymer structure in a programmed state changes to an activated state upon exposure to an agent, and wherein the shape memory polymer structure in the programmed state has a first color and the shape memory polymer structure in the activated state has a second color.

2. The chromogenic sensor of claim 1, wherein a color difference between the first color and the second color is perceptible to a human eye.

3. The chromogenic sensor of claim 1, wherein the first liquid is ethanol.

4. The chromogenic sensor of claim 3, wherein the liquid mixture is gasoline.

5. The chromogenic sensor of claim 1, wherein one or more dimensions of the waveform cross-section in the programmed state is different than one or more dimensions in the activated state.

6. The chromogenic sensor of claim 5, wherein a change in the one or more dimensions results in the shape memory polymer structure in the programmed state having the first color and the shape memory polymer structure in the activated state having the second color.

7. The chromogenic sensor of claim 1, wherein the waveform cross-section is a rectangle waveform cross-section.

8. The chromogenic sensor of claim 1, wherein the waveform cross-section is a sawtooth waveform cross-section.

9. The chromogenic sensor of claim 1, wherein the waveform cross-section is a pyramidal waveform cross-section.

10. A kit for testing the presence of a first liquid, comprising: a chromogenic sensor and instructions for use of the chromogenic sensor to test for the presence of a first liquid in a liquid mixture, wherein the chromogenic sensor, comprises:

a shape memory polymer structure in a programmed state, wherein the shape memory polymer structure has a waveform cross-section selected from the group consisting of: a rectangle waveform cross-section, a sawtooth waveform cross-section, and a pyramidal waveform cross-section;

wherein the chromogenic sensor has a characteristic that the shape memory polymer structure in a programmed state changes to an activated state upon exposure to an agent, and wherein the shape memory polymer structure in the programmed state has a first color and the shape memory polymer structure in the activated state has a second color.

11. The kit of claim 10, further comprising a device, wherein an indication of presence of the second color is measured colorimetrically with the device.

12. The kit of claim 10, wherein one or more dimensions of the waveform cross-section in the programmed state is different than one or more dimensions in the activated state.

13. The kit of claim 12, wherein a change in the one or more dimensions results in the shape memory polymer structure in the programmed state having the first color and the shape memory polymer structure in the activated state having the second color.

14. The kit of claim 10, wherein the waveform cross-section is a rectangle waveform cross-section.

15. The kit of claim 10, wherein the waveform cross-section is a sawtooth waveform cross-section.

16. The kit of claim 10, wherein the waveform cross-section is a pyramidal waveform cross-section.

* * * * *